United States Patent

Horacek

(10) Patent No.: US 6,730,381 B2
(45) Date of Patent: May 4, 2004

(54) INTUMESCENT FIRE-PROTECTION STRIPS JACKETED ON THREE SIDES AND COMBINED COLD- AND HOT-GAS SEALS

(75) Inventor: Heinrich Horacek, Linz (AT)

(73) Assignee: Intumex Brandschutzprodukte AG, Linz (AT)

( * ) Notice: Subject to any disclaimer, the term of this patent is extended or adjusted under 35 U.S.C. 154(b) by 0 days.

(21) Appl. No.: 09/798,958

(22) Filed: Mar. 6, 2001

(65) Prior Publication Data

US 2003/0035912 A1 Feb. 20, 2003

(30) Foreign Application Priority Data

Mar. 7, 2000 (AT) .............................. 376/2000

(51) Int. Cl.$^7$ ........................... B32B 18/00; B27N 9/00; C08K 3/04; C08K 5/52; C09K 21/14
(52) U.S. Cl. ................. 428/36.8; 428/323; 428/325; 428/45; 428/920; 428/921; 524/495; 524/127; 524/141; 524/115; 523/179
(58) Field of Search ................. 428/36.8, 323, 428/325, 45, 920, 921; 524/495, 127, 141, 115; 523/179

(56) References Cited

U.S. PATENT DOCUMENTS

| 4,221,092 A | * | 9/1980 | Johnson ........................ 52/232 |
| 4,599,369 A | * | 7/1986 | Malcolm-Brown ......... 523/179 |
| 4,945,015 A | * | 7/1990 | Milner et al. ................ 523/179 |
| 5,384,188 A | * | 1/1995 | Lebold et al. .............. 428/283 |
| 5,578,671 A | * | 11/1996 | Welna ........................ 524/443 |
| 6,031,040 A | | 2/2000 | Horacek ..................... 524/495 |
| 6,340,645 B1 | * | 1/2002 | Horacek et al. ............ 442/138 |

FOREIGN PATENT DOCUMENTS

| EP | 0 745 751 | 12/1996 |
| WO | 98/30654 | 7/1998 |

* cited by examiner

*Primary Examiner*—Harold Pyon
*Assistant Examiner*—Catherine A. Simone
(74) *Attorney, Agent, or Firm*—Wenderoth, Lind & Ponack, L.L.P.

(57) ABSTRACT

Coextruded, intumescent fire-protection strips jacketed on three sides, obtained by coextruding an intumescent composition composed of a thermoplastic elastomer with a processing temperature of not more than 250° C. selected from the class consisting of block copolymers and uncrosslinked thermoplastic polyolefins, sulfuric-acid-treated graphite, flame retardant, and an inorganic additive which forms an enamel or forms a ceramic, and a three-sided jacket, where appropriate in association with a chambered profile, made from a thermoplastic elastomer with a processing temperature of not more than 250° C. selected from the class consisting of block copolymers and uncrosslinked thermoplastic polyolefins, flame retardant, and, where appropriate, a color pigment, where the fire-protection strips may be designed either as a hot-gas seal or else as a combined cold- and hot-gas seal with spatially separated functions.

12 Claims, No Drawings

US 6,730,381 B2

INTUMESCENT FIRE-PROTECTION STRIPS JACKETED ON THREE SIDES AND COMBINED COLD- AND HOT-GAS SEALS

FIELD OF THE INVENTION

The invention relates to intumescent fire-protection strips jacketed on three sides and to combined cold- and hot-gas seals, these being produced by coextrusion.

DESCRIPTION OF THE RELATED ART

A very wide variety of intumescent strips are known, and an example of their use is as a hot-gas seal for fire-protection doors or fire-protection windows. For example, WO 98/30654 gives a fairly general description of a halogen-free intumescent composition which comprises a carrier material and an intumescent component. The carrier materials used here are various halogen-free polymers capable of changing their shape on exposure to heat. The intumescent component may be graphite or vermiculite, for example. This composition may also comprise one or more halogen-free flame retardants. The individual constituents are first mixed and then extruded as strips. Where appropriate, these strips may also be jacketed. This jacket may be composed of a rigid or flexible plastic, and it comprises no other constituents. WO 98/30654 does not describe any trials or indicate the functionality of the strips claimed.

EP-A1-0 509 701 describes a fire-protection strip composed of an intumescent material, such as Palusol, jacketed by a rigid plastic, such as rigid polyvinyl chloride (PVC), and the jacket here has a connection to a flexible seal part made from a flexible plastic, such as PVC or a flexible thermoplastic elastomer compatible with rigid PVC.

Another variant is known from EP-B1-0 745 751. According to EP-B1-0 745 751, 2 types of intumescent strips are produced. For example, a fully jacketed strip is produced by coextrusion of an elongate support with an inner cavity, preferably made from rigid PVC, and of an elongate insert made from a flexible material which swells, the insert being extruded into the cavity of the support. The support here is extruded with a relatively high temperature, while the insert is extruded with a low temperature. The extruded components here first have to be rapidly passed through a cooled shaping apparatus and then through another cooling apparatus. To obtain a fire-protection strip jacketed on three sides, the intumescent insert is extruded into the cavity of the support once the latter has been extruded.

It was an object of the present invention to find new fire-protection strips which firstly have properties superior to those of the prior art, for example a higher expansion factor, a higher ignition residue, and a higher blow-out time, and which secondly can be produced at various widths by simple coextrusion without complicated additional apparatus, such as cooling apparatus.

BRIEF SUMMARY OF THE INVENTION

Unexpectedly, it was possible to achieve this object by means of a strip jacketed on three sides, where both the jacket of these strips and their intumescent composition are composed of specific thermoplastic elastomers which have very good qualities in relation to use with fillers, and where the intumescent composition of these strips those comprises, inter alia, a sulfuric-acid-treated graphite.

The present invention therefore provides coextruded, intumescent fire-prevention strips jacketed on three sides and composed of a) an intumescent composition made from
  $a_1$) a thermoplastic elastomer with a processing temperature of not more than 250° C. selected from the class consisting of block copolymers and uncrosslinked thermoplastic polyolefins,
  $a_2$) sulfuric-acid-treated graphite,
  $a_3$) flame retardant, and
  $a_4$) an inorganic additive which forms an enamel or forms a ceramic,
and
b) a three-sided jacket, where appropriate in association with a chambered profile, made from
  $b_1$) a thermoplastic elastomer with a processing temperature of not more than 250° C. selected from the class consisting of block copolymers and uncrosslinked thermoplastic polyolefins,
  $b_2$) flame retardant, and, where appropriate,
  $b_3$) a color pigment, and obtained by coextrusion of a) and b).

DETAILED DESCRIPTION

The fire-protection strips of the invention are therefore composed of an intumescent composition a), surrounded on three sides by the jacket b).

Both the intumescent composition a) and the jacket comprise a thermoplastic elastomer (TPE) with a processing temperature of not more than 250° C. selected from the class consisting of block copolymers and uncrosslinked thermoplastic polyolefins. The TPEs used preferably have a processing temperature of not more than 200° C.

Suitable TPEs are block copolymers of styrene type (TPE-S), such as styrene-butadiene-styrene block copolymers or styrene-isoprene-styrene block copolymers (e.g. Kraton D, from the company Shell Chemical), or styrene-ethylene-co-butadiene-styrene block copolymers (e.g. Kraton G from the company Shell Chemical), polyetherpolyamr de block copolymers (TPE-A), (e.g. Pebax from the company Atochem), polyurethane-polyether or -polyester block copolymers (TPE-U) (e.g. Elastollan from the company BASF), or polyether-polyester block copolymers (TPE-E) (e.g. Hytrel from the company DuPont).

Other suitable polymers are uncrosslinked thermoplastic polyolefins (TPE-O). These are ethylene-octene copolymers prepared, for example, by metallocene catalysis (e.g. Engage from the company DuPont or Exact from the company DSM).

Where appropriate, conventional additives such as impact modifiers, coupling agents, antioxidants, etc. may be added to the TPE used. Examples of impact modifiers and coupling agents which may be used are those from the family of polyolefinic plastics grafted with a reactive maleic anhydride group (e.g. Fusabond from the company DuPont), random copolymers having methacrylic acid functionality in a base skeleton of polyethylene (e.g. Surlyn from the company DuPont) or polymers based on a skeleton in which there is a random distribution of glycidyl methacrylate as reactive group together with ethylene units and acrylate units (e.g. Elvaloy from the company DuPont). Preference is given here to polymers based on a skeleton in which there is a random distribution of glycidyl methacrylate as reactive group together with ethylene units and acrylate units.

Examples of antioxidants which may be used are compounds based on benzene-propionic acid derivatives, such as Irganox from the company Ciba-Geigy, or compounds based on phosphorus-containing bisdimethylethylphenyl derivatives, for example Irgafos from the company Ciba-Geigy.

A compatible polymer such as polyethylene (e.g. LLDPE) may also be added as a diluent to the appropriate TPE for reasons of cost. It is preferable for these additives to be added to the TPE-Os. The block copolymers are preferably used without additives, but it is possible to dilute a block by adding a suitable polymer. For example, polybutadiene or polystyrene may be added to a styrene-butadiene-styrene block copolymer.

The proportion of TPE or, where appropriate, of TPE in about 20 to about 80% by weight, preferably from 25 to 60% by weight, both in the intumescent composition a) and in the jacket.

The proportion of TPE in the jacket is preferably higher here than in the intumescent composition.

It is moreover preferable for the same TPE to be used for the intumescent composition a) and for the jacket b).

Besides the TPE ($a_1$), the intumescent composition a) also comprises a sulfuric-acid-treated vermicular graphite (S graphite) ($a_2$). The amount of S graphite is from 10 to 50% by weight, preferably from 20 to 45% by weight.

As third component $a_3$), the intumescent composition a) comprises a flame retardant. Preference is given to the use of halogen-free flame retardants. Particular preference is given to the use of nitrogen-phosphorus compounds, such as melamine The fire-protection strips of the invention may be used as a hot-gas seal, for example for fire-protection doors or fire-protection windows.

In one particular embodiment, the fire-protection strip of the invention has a structure such that it can function either as a hot-gas seal or else as a cold-gas seal. This combined cold- and hot-gas seal has spatially separated functions. The manner of achieving this is that the jacket b) does not only surround three sides of the intumescent composition a) but also has a chambered profile which serves as cold-gas seal. These combined cold- and hot-gas seals are produced in one piece.

The fire-protection strips of the invention or the combined cold- and hot-gas seal of the invention are obtained by coextruding the intumescent composition a) and the jacket b).

To produce the fire-protection strips of the invention by coextrusion, a coextrusion apparatus is used, composed of a twin-screw extruder for the intumescent mass a), of a single-screw extruder for the jacket b), and of a coextrusion die which allows the production of strips of varying widths (composite head with conically oriented slot dies of various widths, where the width of the strips can be varied via the number of sections used in the head), and where appropriate of a roller take-off for achieving particularly smooth surfaces and of a wind-up for the fire-protection strips jacketed on three sides. In producing the coextruded fire-protection strip of the invention it is not essential to use cooling devices such as those required in EP-B1-0 745 751.

In addition, unlike in EP-B1-0 745 751, the two extruders are at the same temperature.

The coextrusion die permits the production of strips of width from 10 to 60 mm and thickness from 1 to 5 mm, depending on the number of sections used in the head, enabling continuous rolling of the fire-protection strips of the invention.

The invention also provides a process for producing coextruded, intumescent fire-protection strips of the invention which are jacketed on three sides, which comprises extruding the jacket b) at a processing temperature of not phosphates, guanidine phosphates, ammonium hydrogenphosphates, trihydrazinophosphates, etc., in particular ammonium polyphosphate or ethylenediammonium phosphate, or hydroxides, such as magnesium hydroxide or aluminum hydroxide.

The amount of flame retardant added here is from 1 to 10%, by weight, preferably from 2 to 8% by weight.

In addition to these constituents, the intumescent composition a) also comprises an inorganic additive $a_4$) which forms an enamel or forms a ceramic. These may be neutral metal oxide compounds or neutral metal oxide mixtures, for example clay, kaolin, zinc borate, calcium phosphate or feldspar, etc., or else a mixture made from acid oxides, such as silicon dioxide, boron oxide, phosphorus oxide, etc. with basic oxides, such as potassium oxide, sodium oxide, calcium oxide, aluminum oxide, zinc oxide, titanium oxide or magnesium oxide, etc. Component $a_4$) may be composed of one or more inorganic additives.

The amount of component $a_4$) added here is from 5 to 30% by weight, preferably from 10 to 20% by weight.

It is important that the total amount of all of the components does not exceed 100% by weight in the formulation of the intumescent composition.

Besides the TPE, the jacket b) likewise comprises a flame retardant $b_1$). The flame retardant used is again preferably halogen-free. Suitable flame retardants are alumina trihydrate or the abovementioned nitrogen-phosphorus compounds, etc. The proportion of flame retardant in the jacket is from 10 to 50% by weight, preferably from 15 to 40% by weight.

Where appropriate, the jacket may also comprise a color pigment $b_2$). The amount of this added is from 0.5 to 5% by weight, preferably from 0.8 to 3% by weight.

In the jacket, too, it is important that the total amount of all of the components does not exceed 100% by weight. more than 250° C., preferably not more than 200° C., by way of a single-screw extruder and simultaneously extruding the intumescent composition a) at a processing temperature of not more than 250° C., preferably not more than 200° C., into the cavity of the jacket by way of a twin-screw extruder, and then using a suitable coextrusion die, composed of a composite head with conically oriented slot dies of various widths, to obtain coextruded, intumescent fire-protection strips jacketed on three sides and having a width of from 10 to 60 mm and a thickness of from 1 to 5 mm, these being polished, where appropriate, by way of a roller take-off system and then wound up.

In the case of the combined cold- and hot-gas seals, the jacket is extruded in a suitable form which has a chambered profile suitable for cold-gas seals and has the cavity designed to receive the intumescent composition. The resultant fire-protection strips of the invention or combined cold- and hot-gas seals of the invention have properties superior to those of the prior art, such as a higher expansion factor of at least 1:5, and up to 1:9, at 300° C., a higher ignition residue and a higher "blow-out time", and also a simpler method of production.

EXAMPLE 1

A fire-protection strip jacketed on three sides and with the following composition was produced:

Jacket b):
component $b_1$) was composed of 39.8 parts of Engage 8480 uncrosslinked thermoplastic polyolefin (TPE-O) (from the company DuPont), 30 parts of Elvaloy NH impact modifier (from the company DuPont), 30 parts of Dowlex LLDPE polyethylene (from the company Dow), 0.1 part of Irganox 1010 antioxidant (from the company Ciba Geigy), and 0.1 part of Irgafos 168 antioxidant (from the company Ciba Geigy).

The proportion of component $b_1$) in the jacket was 60% by weight.

component $b_2$): 39% by weight of ATH alumina trihydrate (Magnifin, from the company Martinswerk)
component $b_3$): 1% by weight of Bayferrox 140 color pigment (from the company Bayer).

Intumescent composition a):
component $a_1$): mixing specification as for $b_1$)
The proportion of component $a_1$) in the intumescent composition was 40% by weight.
component $a_2$): 40% by weight of S graphite (from the company Kaisersberg)
component $a_3$) 5% by weight of ammonium polyphosphate APP (Exolit AP 422, from the company Clariant)
component $a_4$): 15% by weight of Clay 610 (from the company Bischitzky & Co)

The mixture for the intumescent composition was produced by separate meter into the Leistritz twin-screw extruder, the polymer being fed into zone 1 and the remaining mixture of powders into zone 5.

The mixture for the jacket was metered into a Brabender single-screw extruder. The temperature profile in the Brabender tw-as 150° C. (zone 1) to 180° C. (zone 5), and that in the Leistritz extruder was 140° C. (zone 1) to 180° C. (zone 10).

The coextrusion die gave strips jacketed on three sides measuring 10 mm in width and 3.5 mm in thickness.

A comparative fire-prevention strip was produced from PVC.

The jacketing was composed of 99% by weight of a flame-retardant plasticized PVC from the company Peng Mayer and Drossler (Madroplast 5330FS) and 1% by weight of Bayferrox 140 color pigment (from the company Bayer).

The intumescent composition was composed of 59% by weight of Madroplast 5330FS, 24% by weight of S graphite (from the company Kaisersberg), 7% by weight of Clay 601 (from the company Bischitzky & Co.), and 10% by weight of ammonium polyphosphate (Exolit AP 422, from the company Clariant). The mixture for the intumescent composition was produced by separate meter into the Leistritz extruder, the PVC pellets being fed into zone 1 and the remaining mixture of powders into zone 5.

The extrusion conditions used were as above. Another comparison used was a fire-protection strip likewise based on PVC and corresponding to the prior art of EP 0 745 751.

Mechanical properties and fire performance are given in Table 1.

Each of the strips measured 10×3.5 mm

TABLE 1

| Product | Example 1 | Comparative Example | EP 0 745 751 |
| --- | --- | --- | --- |
| Start of expansion | 200° C. | 200° C. | 210° C. |
| Expansion factor (at 300° C.) | 1:9 | 1:5 | 1:4.5 |
| Ignition residue % by weight at 1000° C. | 20 | 7 | 10 |
| Ignition residue % by weight at 450° C. | >50 | >35 | >40 |
| Blow-out time | 300 min | 200 min | 150 min |

EXAMPLES 2–7

6 further strips jacketed on three sides and measuring 20 mm in width and 2.1 mm in thickness were produced in a manner similar to that of Example 1.

The mixing specifications and properties are given in Tables 2 and 3.

The starting materials used were as follows:

Exact 0230: uncrosslinked thermoplastic polyolefin (TPE-O) (from the company DSM)
Engage 8480: uncrosslinked thermoplastic polyolefin (TPE-O) (from the company DuPont)
Elvaloy 741CP: impact modifier (from the company DuPont)
Dowlex LLDPE: polyethylene (from the company Dow)
Kraton G7720: styrene-ethylene-butadiene-styrene block copolymer (from the company Shell Chemical)
Pebax 2533SNO1: polyether-polyamide block copolymer (TPE-A) (from the company Atochem)
Clay 610: from the company Bischitzky
Exolit AP 422: ammonium polyphosphate APP, from the company Clariant
Chalk, ATH (alumina trihydrate), S graphite, titanium dioxide

TABLE 2

| Starting materials (% by weight) | Ex. 2 | 3 | 4 | 5 | 6 | 7 |
| --- | --- | --- | --- | --- | --- | --- |
| a) Intumescent composition | | | | | | |
| $a_1$) Engage 8480 | 18 | | | | | |
| Exact 0230 | | | | 42.5 | 46.5 | 41 |
| Elvaloy 741 | 13.5 | | | | | |
| Dowex LLDPE | 13.5 | | | | | |

TABLE 2-continued

| Starting materials (% by weight) | Ex. 2 | 3 | 4 | 5 | 6 | 7 |
|---|---|---|---|---|---|---|
| Kraton G7720 | | 37.5 | | | | |
| Pebax 2533SNO1 | | | 42.5 | | | |
| $a_2$) S Graphite | 35 | 40 | 40 | 40 | 35 | 40 |
| $a_3$) Exolit APP 422 | 5 | 5 | 5 | 5 | 5 | 5 |
| $a_4$) Clay 610 | 15 | 10 | 5 | 5 | 10 | 10 |
| Chalk | / | 7.5 | 7.5 | 7.5 | / | / |
| TiO | | | | | 3.5 | |
| Al (OH) | | | | | | 4 |
| b) Jacket for Ex. 2–7 | | | | | | |
| $b_1$) Mixing specification identical with $a_1$), 80% by weight | | | | | | |
| $b_2$) 19% by weight of ATH | | | | | | |
| $b_3$) 1% by weight of Bayferrox 140 | | | | | | |

TABLE 3

| Properties | Ex. 2 | 3 | 4 | 5 | 6 | 7 |
|---|---|---|---|---|---|---|
| Start Expansion (° C.) | 200 | 200 | 205 | 205 | 200 | 200 |
| Expansion factor (at 300° C.) | 1:7 | 1:8 | 1:8 | 1:7 | 1:7 | 1:7 |
| Ignition residue % by weight at 1000° C. | 18.7 | 17.7 | 17.4 | 17.5 | 16.5 | 17.0 |
| Ignition residue % by weight at 450° C. | >65 | >60 | >60 | >60 | >60 | >65 |
| Blow-out time (min) | 200 | 250 | 300 | 250 | 250 | 300 |

What is claimed is:

1. A coextruded, intumescent fire-protection strip jacketed on three sides and composed of
   a) an intumescent composition made from
      $a_1$) a thermoplastic elastomer with a processing temperature of not more than 250° C. selected from the group consisting of block copolymers and uncrosslinked thermoplastic polyolefins,
      $a_2$) sulfric-acid-treated graphite,
      $a_3$) flame retardant, and
      $a_4$) an inorganic additive which forms an enamel or forms a ceramic, and
   b) a three-sided jacket, optionally in association with a chambered profile, made from
      $b_1$) a thermoplastic elastomer with a processing temperature of not more than 250° C. selected from the group consisting of block copolymers and uncrosslinked thermoplastic polyolefins,
      $b_2$) flame retardant, and, optionally,
      $b_3$) a color pigment,
and obtained by coextrusion of a) and b).

2. The fire-protection strip as claimed in claim 1, wherein the thermoplastic elastomers $a_1$) and $b_1$) used comprise block copolymers selected from the group consisting of styrene-butadiene-styrene block copolymers, styrene-isoprene-styrene block copolymers and styrene-ethylene-co-butadiene-styrene block copolymers, polyether-polyamide block copolymers, polyurethane-polyether or -polyester block copolymers, polyether-polyester block copolymers, and uncrosslinked thermoplastic polyolefins.

3. The fire-protection strip as claimed in claim 1, wherein additives selected from the group consisting of impact modifiers, coupling agents, and antioxidants are added to the thermoplastic elastomers.

4. The fire-protection strip as claimed in claim 1, wherein the proportion of thermoplastic elastomers in the intumescent composition a) and in the jacket b) is from 20 to 80% by weight.

5. The fire-protection strip as claimed in claim 1, wherein the amount of sulfuric-acid-treated graphite is from 10 to 50% by weight.

6. The fire-protection strip as claimed in claim 1, wherein the flame retardants $a_3$) and $b_2$) used are nitrogen-phosphorus compounds selected from the group consisting of melamine phosphates, guanidine phosphates, ammonium hydrogenphosphates, ammonium polyphosphates, ammonium trihydrazinophosphates, or are ethylenediammonium phosphate, or are hydroxides, or are hydrates, where the proportion of $a_3$) in the intumescent composition a) is from 1 to 10% by weight, and the proportion of $b_2$) in the jacket is from 10 to 50% by weight.

7. The fire-protection strip as claimed in claim 1, wherein the inorganic additive $a_4$) which forms an enamel or forms a ceramic comprises neutral metal oxide compounds or neutral metal oxide mixtures selected from the group consisting of clay, kaolin, zinc borate, and calcium phosphate, or feldspar, or is a mixture made from acidic oxides selected from the group consisting of silicon dioxide, boron oxide, and phosphorus oxide with basic oxides selected from the group consisting of potassium oxide, sodium oxide, calcium oxide, aluminum oxide, zinc oxide, titanium oxide, and magnesium oxide, the proportion of $a_4$) being from 5 to 30% by weight.

8. The fire-protection strip as claimed in claim 1, designed as a combined cold- and hot-gas seal with spatially separated functions, where the three-sided jacket b) has been combined with a chambered profile which serves as cold-gas seal and has the same formulation as the jacket.

9. The fire-protection strip as claimed in claim 1, which has an expansion factor of from 1:5 to 1:9 at 300° C.

10. The fire-protection strip as claimed in claim 6, where the hydroxides are magnesium hydroxide or aluminum hydroxide and the hydrate is alumina trihydrate.

11. The fire-protection strip as claimed in claim 9, having an expansion factor of above 1:5 and up to 1:9 at 300° C.

12. A process for producing fire-protection strips as claimed in claim 1, which comprises extruding the jacket b) at a processing temperature of not more than 250° C. by way of a single-screw extruder and simultaneously extruding the intumescent composition a) at a processing temperature of not more than 250° C. into the cavity of the jacket by way of a twin-screw extruder, and then using a suitable coextrusion die, composed of a composite head with conically oriented slot dies of various widths, to obtain coextruded, intumescent fire-protection strips jacketed on three sides and having a width of from 10 to 60 mm and a thickness of from 1 to 5 mm, these being polished, where appropriate, by way of a roller take-off system and then wound up.

* * * * *